Dec. 23, 1952 K. L. BELL 2,623,109
ELECTRICALLY CONTROLLED LIGHT FILTER
Filed Aug. 6, 1948 2 SHEETS—SHEET 1

INVENTOR.

Keith L. Bell

Dec. 23, 1952 K. L. BELL 2,623,109

ELECTRICALLY CONTROLLED LIGHT FILTER

Filed Aug. 6, 1948 2 SHEETS—SHEET 2

INVENTOR.

Keith L. Bell

Patented Dec. 23, 1952

2,623,109

UNITED STATES PATENT OFFICE 2,623,109

ELECTRICALLY CONTROLLED LIGHT FILTER

Keith L. Bell, Washington, D. C., assignor, by direct and mesne assignments, to Prentice E. Edrington, Alexandria, Va., as trustee Application August 6, 1948, Serial No. 42,841

8 Claims. (Cl. 177—318)

This invention relates to television transmission and reception of images in general. More particularly, this invention relates to the transmission and reception of images in their natural color by television, and which, in its broader aspects, may be used for other purposes.

A particular object of this invention is to provide a color television system employing electrically controlled non-mechanical color filters or light mixers.

Another particular object of this invention is to provide a color television system in which images in the primary and complementary colors are transmitted in sequence through the use of electrically controlled non-mechanical color filters of a kind which filters colored light by the use of colored light.

A further object of this invention is to provide a color television system in which light filters at the transmitter and receiver are electrically controlled in synchronous sequence without the use of moving parts.

Another and still further object of this invention is to provide a synchronous sequential electronic control color filter or light mixer applicable to present television transmitters and receivers as an accessory without necessitating additional synchronous impulse transmission or any present frequency channel alteration.

Yet another and still further object of this invention is to provide an electrically controlled light filter which interlaces the three primary colors periodically to form the three complementary colors which makes possible the simultaneous transmission and reception of televised images in their primary and complementary colors.

Other and further objects of this invention will be apparent to those skilled in the art to which it relates from the following specification, claims, and drawing.

In accordance with this invention there is provided a system for the transmission and reception of images in their natural color by television. This system employs a set of electrically controlled color filters at the transmitter and at the receiver. These color filters or mixers consist of a transparent member made of glass, "lucite" or fused quartz, or the like, circumferentially surrounded by and in physical contact with gaseous glow tubes which luminesce in the primary colors. These glow tubes are connected into an electronic circuit so as to flash a given number of times per second. Both the transmitter of the television images and the receiver are provided with a set of filters consisting of the aforesaid transparent member surrounded by the gaseous glow tubes and the transmitter filter is operated synchronously with the filter at the receiver. This synchronous operation is obtained by causing the electronic circuits of the filters to be simultaneously actuated by the synchronized horizontal scanning blanking retrace pulse, so that the synchronized horizontal blanking retrace pulse transmitted in the conventional black and white television system may be employed also for synchronously controlling the electrically controlled non-mechanical colored light filters of this invention. However, it is to be considered within the scope of this invention to employ the vertical scanning impulse to synchronize the light filters when desired.

Referring to the drawings briefly, Figure 1 is a schematic wiring diagram of a transmitter of natural color television images in accordance with this invention.

Figure 2 is a schematic wiring diagram of a natural color television image receiver.

Figure 3 is a self-explanatory chart showing how the complementary colors are produced by the interlaced blending of different sequential flashes of the primary colors of green, red, and blue, respectively. It is a well-known fact that any two primary light colors will when blended produce one of the complementary colors of purple, yellow, or bluish-green. The primary color flashes of green, red, and blue are designated on the chart by the letters G, R, and B, respectively.

Figure 1:
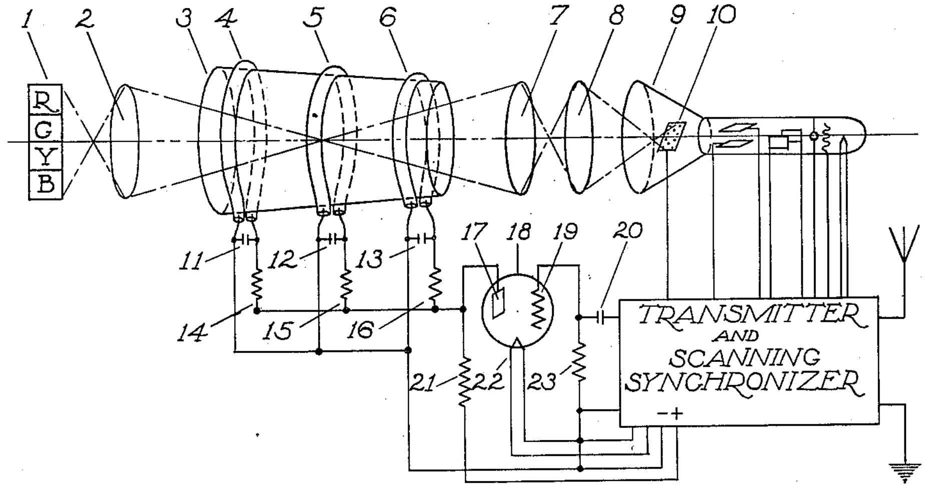

In Figure 1 of the drawing there is illustrated a schematic wiring diagram of a television transmitter for the transmission of pictures, scenes, or images I in their natural colors. For this purpose there is employed a conventional television transmitting apparatus including a conventional cathode ray tube camera 9 of the iconoscope or orithicon or image dissector type.

The red, green, yellow, and blue colors of the image I are focused by means of the lenses 2, 7, and 8 upon the photoelectric element target or mosaic 10 of the camera 9. Interposed between lenses 2 and 7 is a color filter consisting of a transparent prismatic member 3 that may be made in the shape of a truncated cone and is made of a solid transparent material such as glass, "lucite," fused quartz, or the like. This member may be made in the shape of a relatively thin disc having just sufficient thickness so that the thin circularly shaped luminescent tubes 4, 5, and 6 may be mounted side by side in spaced relationship on the outer surface or edge thereof. If desired grounded metallic screens or shields may be interposed between the luminescent tubes 4, 5, and 6 so that voltages or electrostatic charges of different ones of these tubes will not affect or influence the firing luminescence or ionization of the others.

The tubes 4, 5, and 6 are filled with and contain different gases in order to obtain luminescence of different colors inasmuch as these tubes are arranged to luminesce in the different primary colors of green, red, and blue, respectively. It is, of course, obvious that these tubes may be provided with fluorescent coatings on the inside thereof to produce these different primary colors and in that case each tube 4, 5, and 6 may be provided with a small quantity of mercury which when ionized produces the ultra violet radiation necessary to cause fluorescense of the fluorescent coating.

Capacitors 11, 12, and 13 are connected across the two electrical terminals of the colored gaseous glow tubes 4, 5, and 6, respectively, and these capacitors are of different values so as to produce a sequential frequency of luminescence of the tubes 4, 5, and 6 as will be hereinafter more fully described. One terminal of each of the capacitors 11, 12, and 13 and one terminal of each of the tubes 4, 5, and 6 are connected to one terminal of a negatively polarized D. C. power supply. The other terminals of the tubes 4, 5, and 6 are connected to the other terminals of the capacitors 11, 12, and 13. One terminal of each of the resistors 14, 15, and 16 are individually connected to one terminal of each of the gaseous glow tubes 4, 5, and 6. The other terminals of resistors 14, 15, and 16 are connected to anode 17 of vacuum tube trigger 18. One terminal of the voltage dropping resistor 21 is connected to anode 17. The other terminal of resistor 21 is connected to a positively polarized direct current power supply. Control grid 19 is connected to one terminal of biasing resistor 23 and one terminal of coupling capacitor 20. The other terminal of resistor 23 is connected to the negatively polarized direct current power supply and to the cathode 22 and to the synchronized horizontal blanking retrace pulse circuit in a suitable manner. The other side of coupling capacitor 20 is also connected to the synchronized horizontal blanking retrace circuit for suitable polarization.

The capacitor 11 and the resistor 14 together form an R.-C. circuit having a definite time constant. Likewise, the capacitor 12 and the resistor 15 form an R.-C. circuit having a slightly different time constant and the capacitor 13 and resistor 16 form an R.-C. circuit having a further slightly different time constant from the two previous R.-C. circuits.

Vacuum tube trigger 18 having the anode 17 connected in series with the voltage dropping resistor 21 has the grid cathode circuit thereof coupled to the circuit of the synchronized horizontal blanking retrace pulse circuit of the cathode ray device 9 through the coupling capacitor 20 so that the current through the vacuum tube trigger 18 is controlled in accordance with the voltage applied to affect the horizontal blanking retrace pulse of the camera 9. Therefore the charging of the capacitors 11, 12, and 13 is also controlled in accordance therewith. When the blanking retrace pulse is impressed on control grid 19 across coupling capacitor 20 current flows in the anode cathode circuit of vacuum tube trigger 18 thus causing a momentary voltage drop across resistor 21 which will simultaneously momentarily extinguish glow tubes 4, 5, and 6. At the end of the retrace pulse tubes 4, 5, and 6 will again luminesce thereby providing a positive synchronizing means. The tubes 4, 5, and 6 may be provided with suitable grids to control the firing thereof if desired and these grids may be positioned either on the inside or the outside of the tubes. Furthermore, various suitable amplifiers may be connected between the vacuum tube trigger 18 and the horizontal retrace pulse circuit of the camera 9 or suitable amplifiers, limiters, or wave shaping devices may be connected between the input of the trigger 18 and the scanning devices of the camera 9 when magnetic deflection is used on camera 9 instead of electrostatic deflection. On the other hand, suitable amplifiers may be connected to the output of the trigger 18 wherein sequentially fired gas discharge tubes of the thyratron type are employed for controlling the tubes 4, 5, and 6 instead of the relaxation oscillator resistor capacitor networks.

Figure 2:
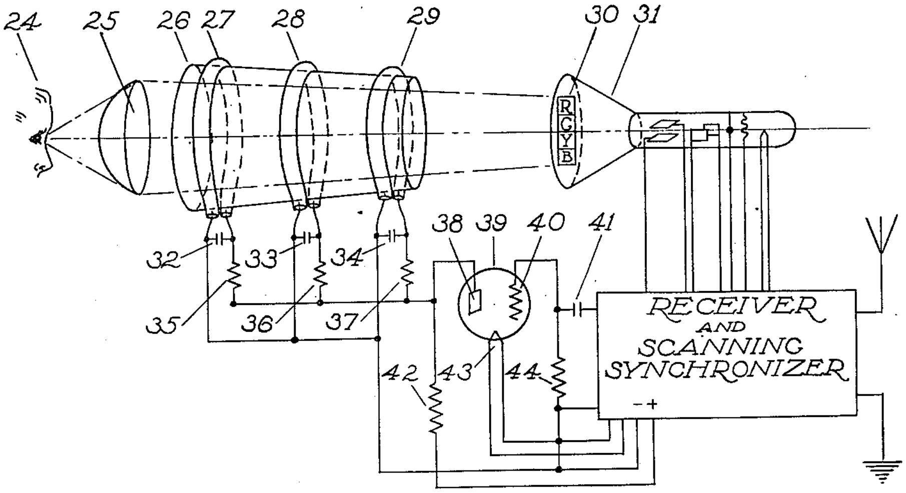
Figure 3:
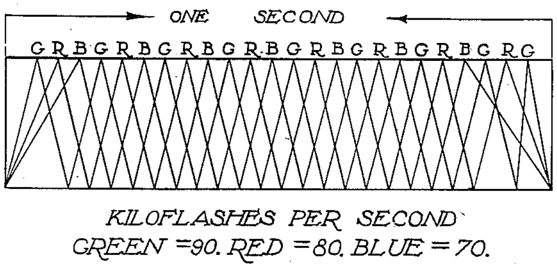

In Figure 2 there is illustrated a receiver for receiving the signals transmitted by the transmitting apparatus shown in Figure 1. The apparatus shown in Figure 2 consists of a cathode ray tube 31 connected to the receiver and having a screen 30 of fluorescent material adapted to fluoresce and produce a distinctly gradative contrasting black and white image corresponding in latent color values to the image 1 sent from the transmitter. The screen 30 is viewed by the operator or viewer 24 through the lens 25 and the filter consisting of a transparent member 26 and luminescent gaseous glow tubes 27, 28, and 29. The luminescent tubes 27, 28, and 29 are made the same as tubes 4, 5, and 6 in Figure 1 and are likewise to capacitors 32, 33, and 34, respectively in the same manner and for the same purpose as the glow tubes 4, 5, and 6 in Figure 1 are connected to the capacitors 11, 12, and 13. The energizing and control circuits for the tubes 27, 28, and 29, are the same as the circuits of the tubes 4, 5, and 6 and will therefore be only briefly described.

In the receiver the vacuum trigger 39 corresponds to the tube 18 of the transmitter and the anode 38 of the trigger tube 39 is connected to a positively polarized D. C. current power supply through voltage dropping resistor 42. One terminal of each of the glow tubes 27, 28, and 29 is connected to one terminal of each of the capacitors 32, 33, and 34 and thence to a negatively polarized D. C. current power supply. The other terminals of glow tubes 27, 28, and 29 are connected to the other terminals of capacitors 32, 33, and 34 and thence to one terminal of each of the resistors 35, 36, and 37. The other terminals of each of the resistors 35, 36, and 37 are connected to the anode 38 of vacuum tube trigger 39 and one end of voltage dropping resistor 42 is connected to anode 38. The other end of resistor 42 is connected to a positively polarized direct current power supply.

Simultaneous synchronism of the flashes of the colored gaseous glow tubes at the transmitter and receiver is insured and maintained by the horizontal blanking retrace pulse being impressed on the grid cathode input circuit of vacuum tube trigger 18 at the transmitter and vacuum tube trigger 39 at the receiver.

The values of the resistors and capacitors in relation to each glow tube are such as to cause by relaxation oscillation the green luminescent gaseous glow tube to flash 90 thousand times per second, the red glow tube 80 thousand times per second, and the blue glow tube 70 thousand times per second. During the flashing periods of the glow tubes where any two flashes of color overlap there is produced one of the complementary colors of purple, yellow or bluish-green, therefore this filter or color mixing means provides for simultaneous transmission and reception of televised images in both the primary and complementary colors.

Figure 4:
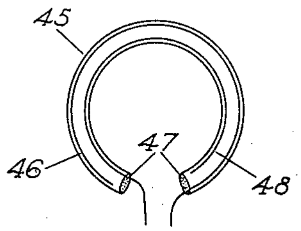
Figure 4 is a detailed view of the luminescent colored gaseous glow tube structure.

Referring back now to Figure 4, the structure of the gaseous glow tubes is shown in detail, wherein 45 is a transparent hollow tube of circular configuration containing a gas which will luminesce in a definite color. 46 and 48 are electrodes shaped to conform to the circular configuration of member 45. 47 is a hermetic sealing means.

Figure 5:
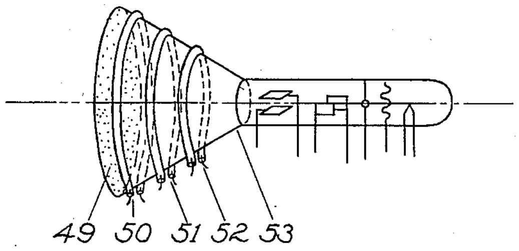
Figure 5 is a view of a cathode ray device to which luminescent colored gaseous glow tubes are attached in accordance with the modified form of this invention.

Figure 5 shows a cathode ray device, 53 having the truncated clear glass portion thereof surrounded by and in spaced relationship, are gaseous glow tubes 50, 51 and 52 for the purpose of diffusing colored light across the rearmost portion of flourescent screen 49.

Figure 6:
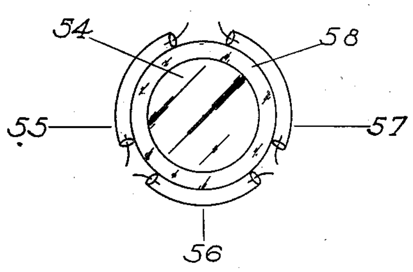
Figure 6 is another modified form of this invention in which segmental luminescent colored gaseous glow tubes are positioned around and forward of the flourescent screen of a cathode ray device.

Figure 6 shows a flourescent screen, 54 of a cathode ray device having curved segmental gaseous glow tubes of different colors, 55, 56, and 57 positioned around clear glass portion 58 and in physical contact therewith for the purpose of diffusing colored lights by material conduction across the front of flourescent screen 54 of the cathode ray device.

Figure 7:
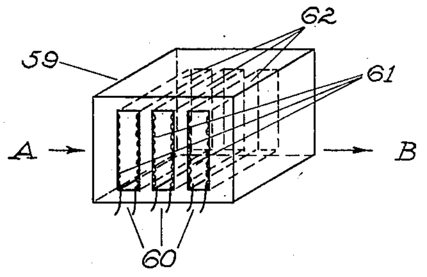
Figure 7 is a modified form of filter or color mixer.

Figure 7 shows a square or rectangular transparent member 39 having 3 separate and individual hollow chambers 62, the hollow chambers 62 each containing an individual gas which will each luminesce in a different color when electrically energized. The vertical walls of the hollow chambers 62 are coated with an electrically conductive transparent coating 61 which when energized through the electrical terminals 60 will cause each of the individually contained gases to luminesce in a different color. The letters A and B designate the line of sight of the televised or received image through transparent member 59. This is an alternative arrangement for the purpose of modifying colored light by the use of colored light.

I claim:

1. A means for filtering light comprising different colors by the use of colored light, said means comprising in combination a solid transparent member disposed across the path of the light to be filtered and a plurality of gaseous glow tubes circumferentially surrounding and in physical contact with said member which luminesce in different colors when electrically energized, and means for sequentially energizing said glow tubes.

2. A means for modifying light comprising different colors by optical and electronic means comprising in combination a solid member transparent to the light to be filtered, different colored gaseous glow tubes in physical contact with said solid transparent member, each of said gaseous glow tubes completely encompassing respective corresponding axially spaced diametrical portions of said transparent solid member, and means for sequentially energizing said glow tubes.

3. An electrically controlled electron activated light filter comprising in combination, a solid member transparent to light to be filtered, three different colored luminescent gaseous glow tubes surrounding the outer periphery of said solid transparent member and in physical contact therewith, and means for sequentially energizing said tubes to cause them to luminesce, said luminescent colored gaseous glow tubes and said transparent member cooperating to provide a single integral multi-colored light filter.

4. A means for filtering light comprising different colors by absorption in solid material subjected to action of light of the primary colors throughout illuminated areas of said solid transparent material, said means comprising three individual luminescent gaseous glow tubes respectively adapted to be connected to a source of electric energy, each glow tube containing a gaseous content of a nature which individually when electrically energized will produce one of the three primary colors green, red, and blue, said glow tubes surrounding and being supported by said transparent material for illuminating them with different kinds of light.

5. A means for the modification of light composed of different colors, said means comprising in combination a truncated conical transparent member, gaseous glow tubes of circular configuration and different circular diameters surrounding said solid transparent member and disposed longitudinally of its axis, said glow tubes being fitted around and onto the outer surface of said transparent member in spaced relationship, and a source of electrical potential for illuminating said glow tubes.

6. A means for modifying the light intensity or brilliancy produced by the gaseous glow tubes of a light absorbing filter utilizing colored light as the filtering medium, comprising solid material having capacity for conducting of light said material being of conical form, in combination with different colored gaseous glow tubes of different circular diameters fitted on and around said solid material at points of corresponding spaced relationship where the diameter of the said transparent member coincides with the diameter of corresponding gaseous glow tubes, and a source of electric potential for illuminating said glow tubes.

7. A means for receiving and reproducing televised images or scenes adapted for reception in their natural color, said means employing an electrically controlled light filter, said filter being interposed in the line of sight between the viewer and the reproduced image or scene appearing on the fluorescent screen of a cathode ray device, said filter comprising in combination a transparent member three different colored gaseous glow tubes encompassing said member, and means for energizing said glow tubes selectively, each of said glow tubes being made to flash at periodic spaced intervals between the flashes of the others by means of a suitable electronic circuit.

8. A means for modifying light composed of different colors by the use of colored light, said means comprising in combination a source of electric energy, a transparent member, said transparent member having three separate hollow chambers in axial alinement, said three hollow chambers containing three different luminescent gases, each of said gases luminescing in a different color when electrically energized, said hollow chambers each having an electrically conductive transparent coating affixed to the side wall thereof normal to the axis of alinement, and means for energizing said gases.

KEITH L. BELL.

REFERENCES CITED

The following references are of record in the file of this patent:

UNITED STATES PATENTS

| Number | Name | Date |
|---|---|---|
| 1,985,685 | Nicolson | Dec. 25, 1934 |
| 2,109,540 | Leishman | Mar. 1, 1938 |
| 2,191,515 | Von Bronk | Feb. 27, 1940 |
| 2,343,971 | Goldsmith | Mar. 14, 1944 |
| 2,350,892 | Hawson | June 6, 1944 |
| 2,413,075 | Schade | Dec. 24, 1946 |